US011197315B2

United States Patent
Yan

(10) Patent No.: US 11,197,315 B2
(45) Date of Patent: Dec. 7, 2021

(54) RANDOM ACCESS FOR WIRELESS COMMUNICATION

(71) Applicant: Lenovo Innovations Limited (Hong Kong), Hong Kong (CN)

(72) Inventor: Zhi Yan, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 52 days.

(21) Appl. No.: 15/774,986

(22) PCT Filed: Nov. 9, 2015

(86) PCT No.: PCT/CN2015/094139
§ 371 (c)(1),
(2) Date: May 9, 2018

(87) PCT Pub. No.: WO2017/079879
PCT Pub. Date: May 18, 2017

(65) Prior Publication Data
US 2018/0332613 A1   Nov. 15, 2018

(51) Int. Cl.
*H04W 74/00* (2009.01)
*H04W 74/08* (2009.01)
*H04W 28/02* (2009.01)

(52) U.S. Cl.
CPC ..... *H04W 74/008* (2013.01); *H04W 28/0289* (2013.01); *H04W 74/08* (2013.01); *H04W 74/0841* (2013.01)

(58) Field of Classification Search
None
See application file for complete search history.

(56) References Cited

U.S. PATENT DOCUMENTS

| | | | | |
|---|---|---|---|---|
| 2013/0301608 A1* | 11/2013 | Frenne | ............... | H04W 74/0833 370/331 |
| 2014/0064111 A1* | 3/2014 | Viorel | ............... | H04W 74/0841 370/252 |
| 2016/0192376 A1* | 6/2016 | Lee | ................... | H04W 72/0406 370/252 |
| 2016/0227575 A1* | 8/2016 | Furuskog | .......... | H04W 72/1294 |

(Continued)

FOREIGN PATENT DOCUMENTS

| | | |
|---|---|---|
| CN | 101690374 A | 3/2010 |
| CN | 101926146 A | 12/2010 |

(Continued)

OTHER PUBLICATIONS

PCT/CN2015/094139, "International Search Report", dated Jul. 29, 2016, pp. 1-3.

(Continued)

*Primary Examiner* — Ajit Patel
*Assistant Examiner* — Pamit Kaur
(74) *Attorney, Agent, or Firm* — Kunzler Bean & Adamson

(57) ABSTRACT

For random access wireless communication, in response to receiving two or more first random access preamble instances, a method generates at least one unique random access response (RAR) for each first random access preamble instance. The time advance information for each first random access preamble instance is different from time advance information for each other first random access preamble instance.

16 Claims, 11 Drawing Sheets

(56) References Cited

U.S. PATENT DOCUMENTS

2017/0279646 A1* 9/2017 Yl ................... H04L 5/0007
2018/0139759 A1* 5/2018 Park ............... H04W 72/0486
2018/0235013 A1* 8/2018 Jung ................ H04W 52/50

FOREIGN PATENT DOCUMENTS

| CN | 103379656 A | 10/2013 |
|---|---|---|
| GN | 101946425 A | 1/2011 |
| GN | 103583071 A | 2/2014 |
| WO | 2012/177060 A2 | 12/2012 |

OTHER PUBLICATIONS

PCT/CN2015/094139, "Writtn Opinion of the International Searching Authority", dated Jul. 29, 2016, pp. 1-3.
Ki-Dong Lee et al., Throughput comparison of random access methods for M2M service over LTE networks, IEEE, 2011 IEEE Globecom Workshop, Dec. 5-9, 2011, pp. 1-2.

* cited by examiner

RANDOM ACCESS FOR WIRELESS COMMUNICATION

FIELD

The subject matter disclosed herein relates to random access and more particularly relates to random access for wireless communication.

BACKGROUND

Description of the Related Art

User equipment may communicate a random access preamble to a base station and receive a random access response to the random access preamble in order to establish a connection to the base station.

BRIEF SUMMARY

A method of random access for wireless communication is disclosed. In response to receiving two or more first random access preamble instances, the method generates at least one unique random access response (RAR) for each first random access preamble instance. The time advance information for each first random access preamble instance is different from time advance information for each other first random access preamble instance. Alternatively, a method receives at least one unique RAR. The method further selects one unique RAR in response to receiving only the one unique RAR and randomly selects one unique RAR from two or more unique RAR in response to the two or more unique RAR having equivalent time advance information. Apparatus also perform the functions of the methods.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
FIG. 1A is a schematic block diagram illustrating one embodiment of a communication system.
Figure 1A:
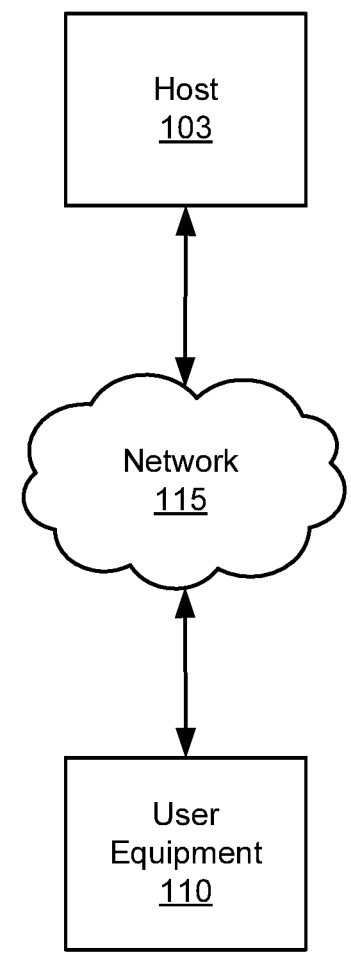

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a communication system 100a. The system 100a includes a host 103, a network 105, and user equipment 110. The host 103 may communicate with the user equipment 110 through the network 105. The host 103 may be a base station such as an evolved node B (eNB) Long Term Evolution (LTE) base station. Alternatively, the host 103 may be a server, a data center, and the like. The user equipment 110 may be a mobile telephone, a tablet computer, a laptop computer, and embedded communication devices in automobiles, kiosks, appliances, metering devices, and the like. The network 115 may be a mobile telephone network, a wide-area network, a wireless network, or combinations thereof.

Figure 1B:
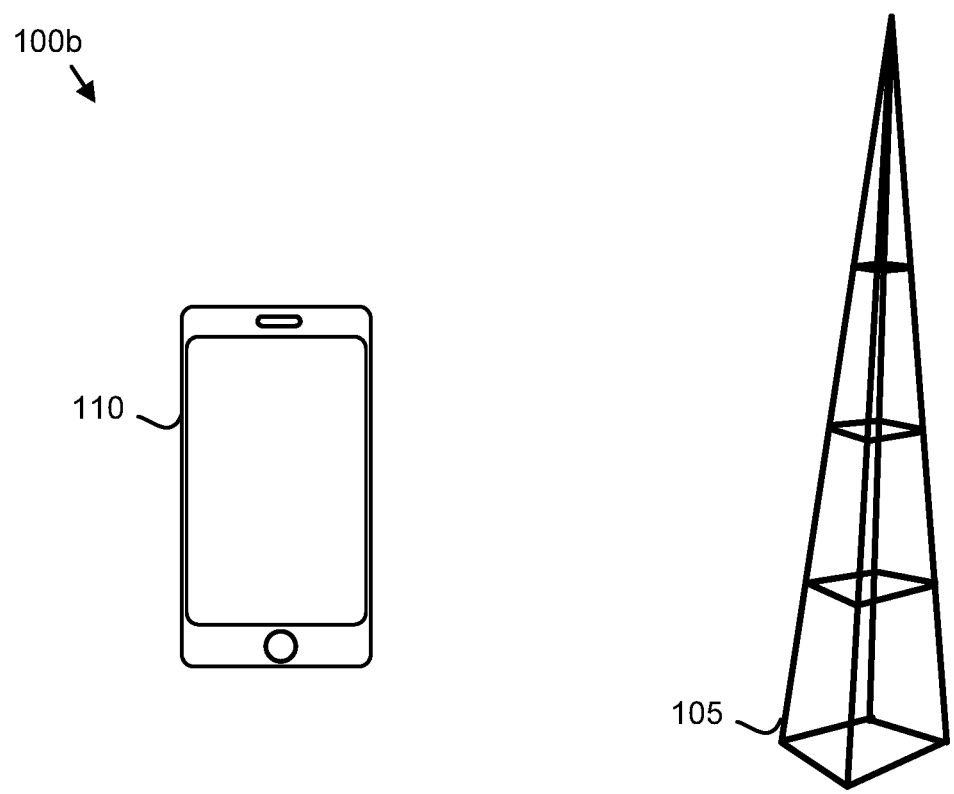
FIG. 1B is a drawing illustrating one alternate embodiment of a wireless communication system.

FIG. 1B is a drawing illustrating one embodiment of a wireless communication system 100*b*. The system 100*b* includes user equipment 110 depicted as a mobile telephone and an eNB base station 105. The eNB base station 105 may be in communication with the network 115. The base station 105 may communicate wirelessly with the user equipment 110.

The user equipment 110 may perform a random access procedure to secure a connection with the network 115. Occasionally, the user equipment 110 may be temporarily unable to secure a connection to the network 115 due to collisions with requests from other devices. However, as the numbers of user equipment 110 that attempt to access the network 115 through a single base station 105 increases, current contention resolution methods will be inadequate to reliably resolve the contentions.

The embodiments described herein generate one or more random access responses (RAR) in response to receiving two or more random access preamble instances in order to reduce contention. In addition, the embodiments select the generated RAR based on criteria that further reduce the contention between different user equipment 110. As a result, the system 100*b* resolves access contention between the user equipment 110 more efficiently and more reliably as will be described hereafter.

Figure 2A:
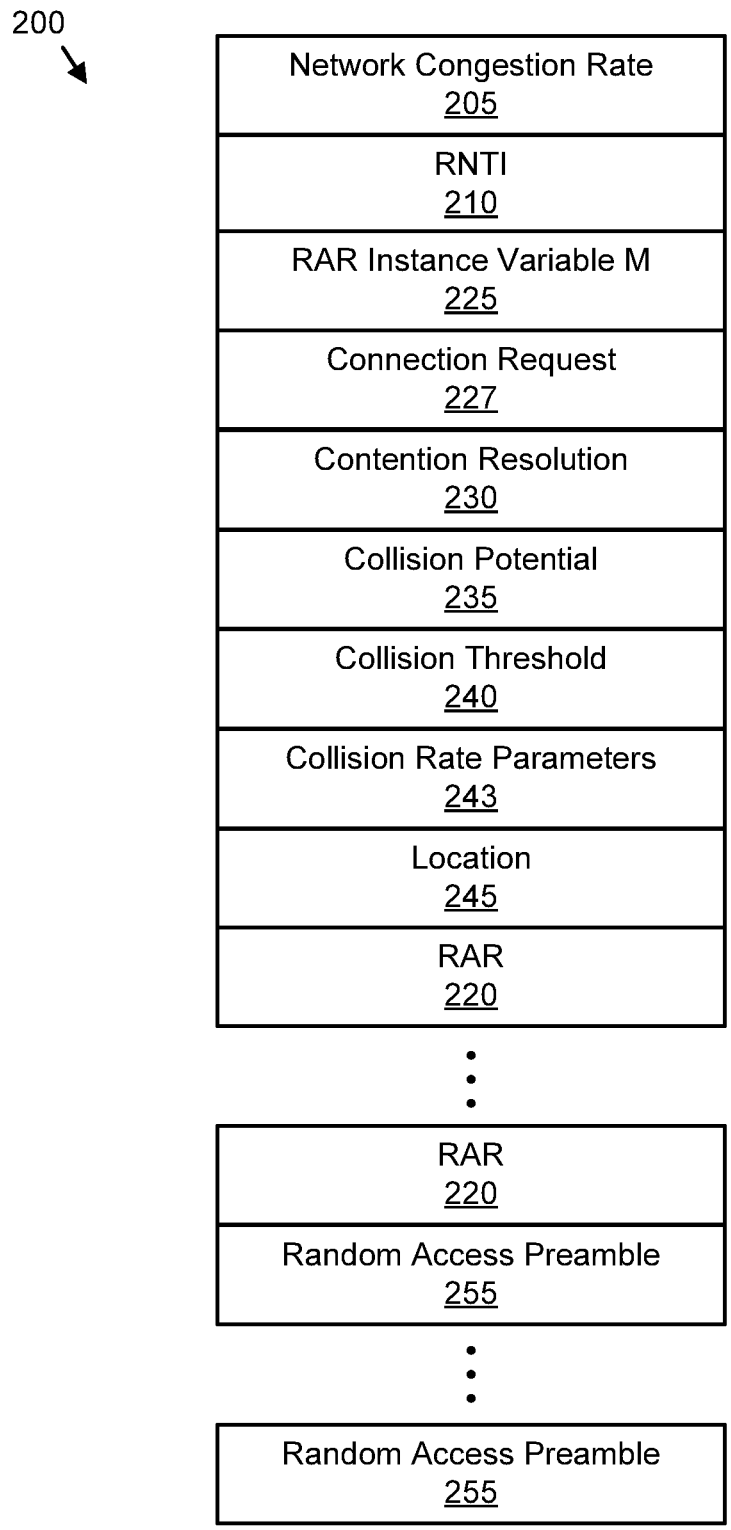
FIG. 2A is a schematic block diagram illustrating one embodiment of base station data.

FIG. 2A is a schematic block diagram illustrating one embodiment of base station data 200. The base station data 200 maybe organized as a data structure in a memory. The base station data 200 may store data used to resolve contentions between user equipment 110 attempting to access the base station 105 and/or the network 115. In the depicted embodiment, the base station data 200 includes a network congestion rate 205, one or more radio network temporary identifier (RNTI) 210, an RAR instance variable M 225, a connection request 227, a contention resolution 230, a collision potential 235, a collision thresholds 240, collision rate parameters 243, a location 245, one or more RAR 220, and one or more random access preambles 255.

The network congestion rate 205 may measure congestion in the network 115 and/or at the base station 105. The network congestion rate 205 may be expressed as a percentage of maximum congestion, a number of collisions for time interval, or the like.

The RNTI 210 may include identifiers used to distinguish radio channels used by the base station 105 and/or user equipment 110 in communication with the base station 105. The RNTI 210 may record random access RNTI (RA-RNTI) used with the RAR 220, and cell RNTI (C-RNTI) and temporary RNTI (T-RNTI) used with the random access preamble 255.

The RAR instance variable M 225 may be used to determine a number of RAR 220 to generate under specified conditions as will be described hereafter. The connection request 227 may be an LTE connection request and may include a T-RNTI. The contention resolution 230 may be an LTE contention resolution that includes a C-RNTI and may be communicated from the base station 105 to the user equipment 110 as will be described hereafter.

The collision potential 235 may express a probability of a collision between random access preambles 255 from instances of user equipment 110. The collision threshold 240 may indicate when to modify the RAR instance variable M 225 based on the collision potential 235. The collision rate parameters 243 may be used to calculate the collision potential 235.

The location 245 may be the physical location of the base station 105. Alternatively, the location 245 may be expressed as a communication delay between the user equipment 110 and the base station 105 and/or the network 115. The RAR 220 are described in more detail in FIG. 3B. The random access preamble 255 is described in more detail in FIG. 3A.

Figure 2B:
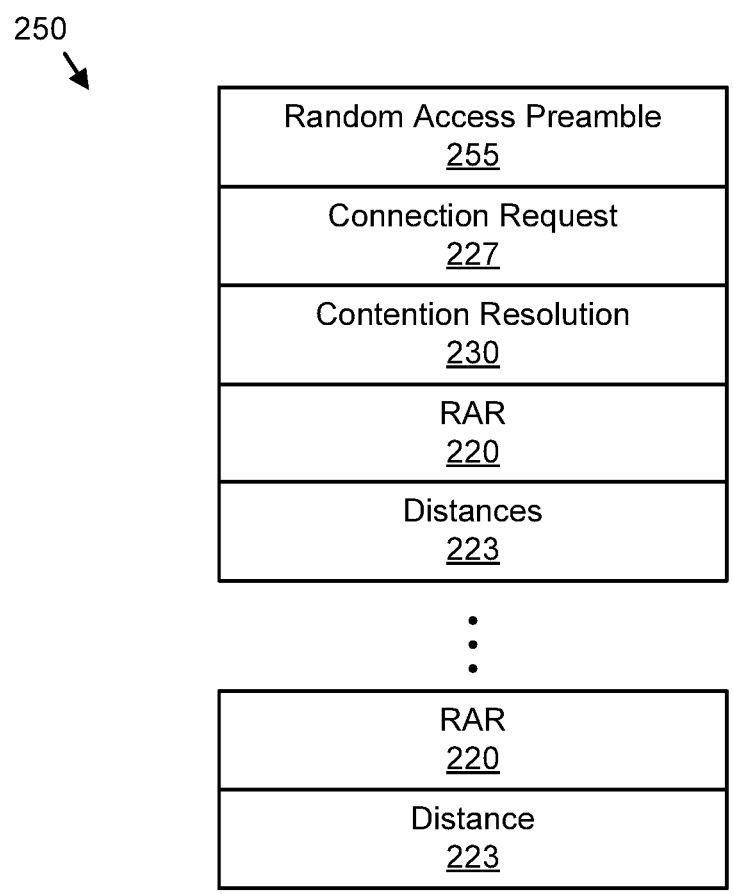
FIG. 2B is a schematic block diagram illustrating one embodiment of user equipment data.

FIG. 2B is a schematic block diagram illustrating one embodiment of user equipment data 250. The user equipment data 250 maybe organized as a data structure in memory. The user equipment data 250 may be used by the user equipment 110 to access the base station 105 and/or network 115. In the depicted embodiment, the user equipment data 250 includes the random access preamble 255, the connection request 227, the contention resolution 230, one or more RAR 220, and distances 223 associated with each of the one or more RAR 220.

In one embodiment, the distances 223 are physical distances between the user equipment 110 and the base station 105 associated with the RAR 220. Alternatively, the distances 223 are time delay distances between the user equipment 110 at the network 115 through the base station 105 associated with the RAR 220. The distances 223 may be calculated from the time delay between the base station 105 and the user equipment 110. Alternatively, the distances 223 may be calculated from a global positioning system (GPS) position for the user equipment 110 and the location 245.

Figure 3A:
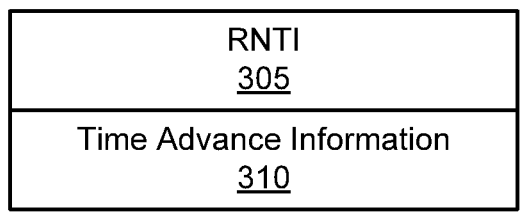
FIG. 3A is a schematic block diagram illustrating one embodiment of a random access preamble.

FIG. 3A is a schematic block diagram illustrating one embodiment of a random access preamble 255. For simplicity, only a portion of the random access preamble 255 is shown. The random access preamble 255 maybe organized as a data structure in a memory and/or transmitted as a communication packet. In the depicted embodiment, the random access preamble 255 comprises an RNTI 305 and time advance information 310. The RNTI 305 may be a C-RNTI or a T-RNTI. The RNTI 305 may identify the random access preamble 255.

The time advance information 310 may indicate a length of time a communication takes to reach the base station 105 from the user equipment 110. Alternatively, the time advance information 310 may indicate the length of time a communication takes to reach the network 115 from the user equipment 110. In one embodiment, the time advance information 310 includes a timestamp.

Figure 3B:
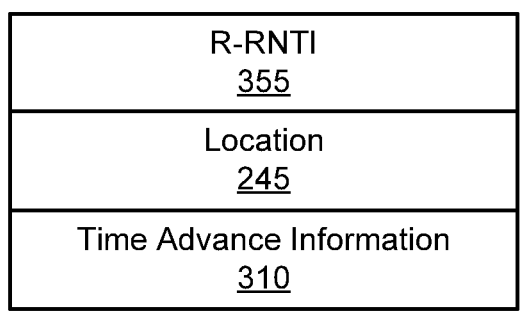
FIG. 3B is a schematic block diagram illustrating one embodiment of a random access response.

FIG. 3B is a schematic block diagram illustrating one embodiment of an RAR 220. For simplicity, only a portion of the RAR 220 is shown. The RAR 220 maybe organized as a data structure in a memory and/or transmitted as a communication packet. In the depicted embodiment, the RAR 220 includes an RNTI 355, a location 245, and the time advance information 310. The RNTI 355 may be an R-RNTI may identify the RAR 220. The location 245 may be a physical location of the base station 105.

Figure 4:
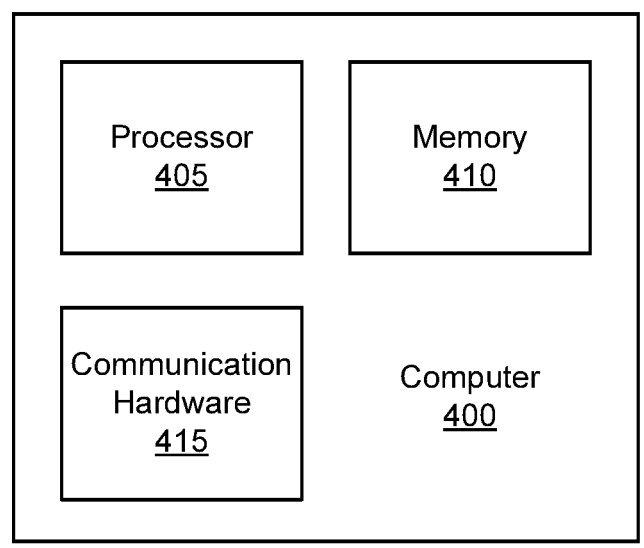
FIG. 4 is a schematic block diagram illustrating one embodiment of a computer.

FIG. 4 is a schematic block diagram illustrating one embodiment of a computer 400. The computer 400 may be embodied in the user equipment 110. Alternatively, the computer 400 may be embodied in the host 103, the network 115, and/or the base station 105. In the depicted embodiment, the computer 400 includes a processor 405, a memory 410, and communication hardware 415. The memory 410 may comprise a semiconductor storage device, a hard disk drive, an optical storage device, a micromechanical storage device, or combinations thereof. The memory 410 may store code. The processor 405 may execute the code. The communication hardware 415 communicate with other devices.

Figure 5A:
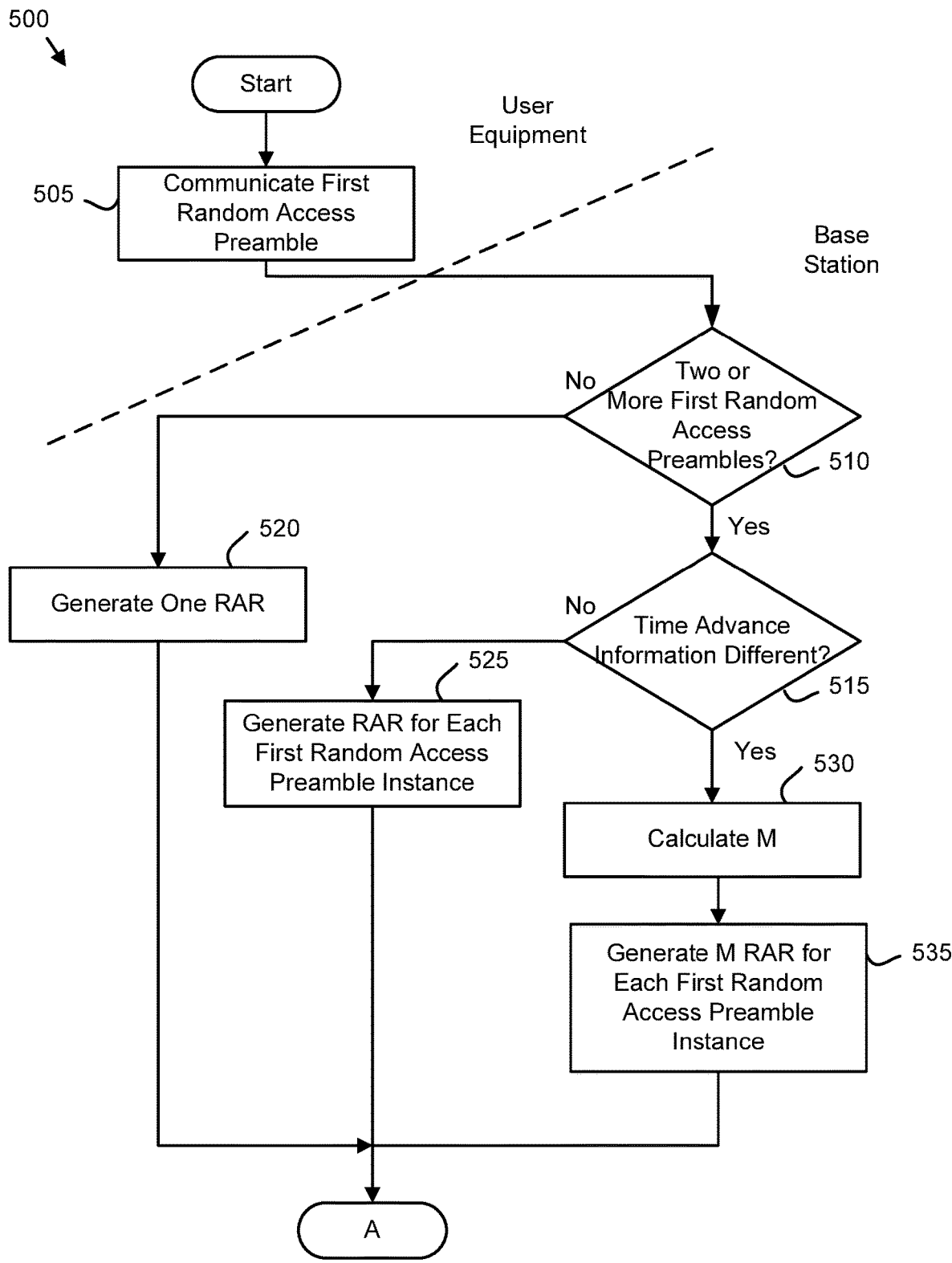
FIGS. 5A-B are schematic flow chart diagrams illustrating one embodiment of a random access method.
Figure 5B:
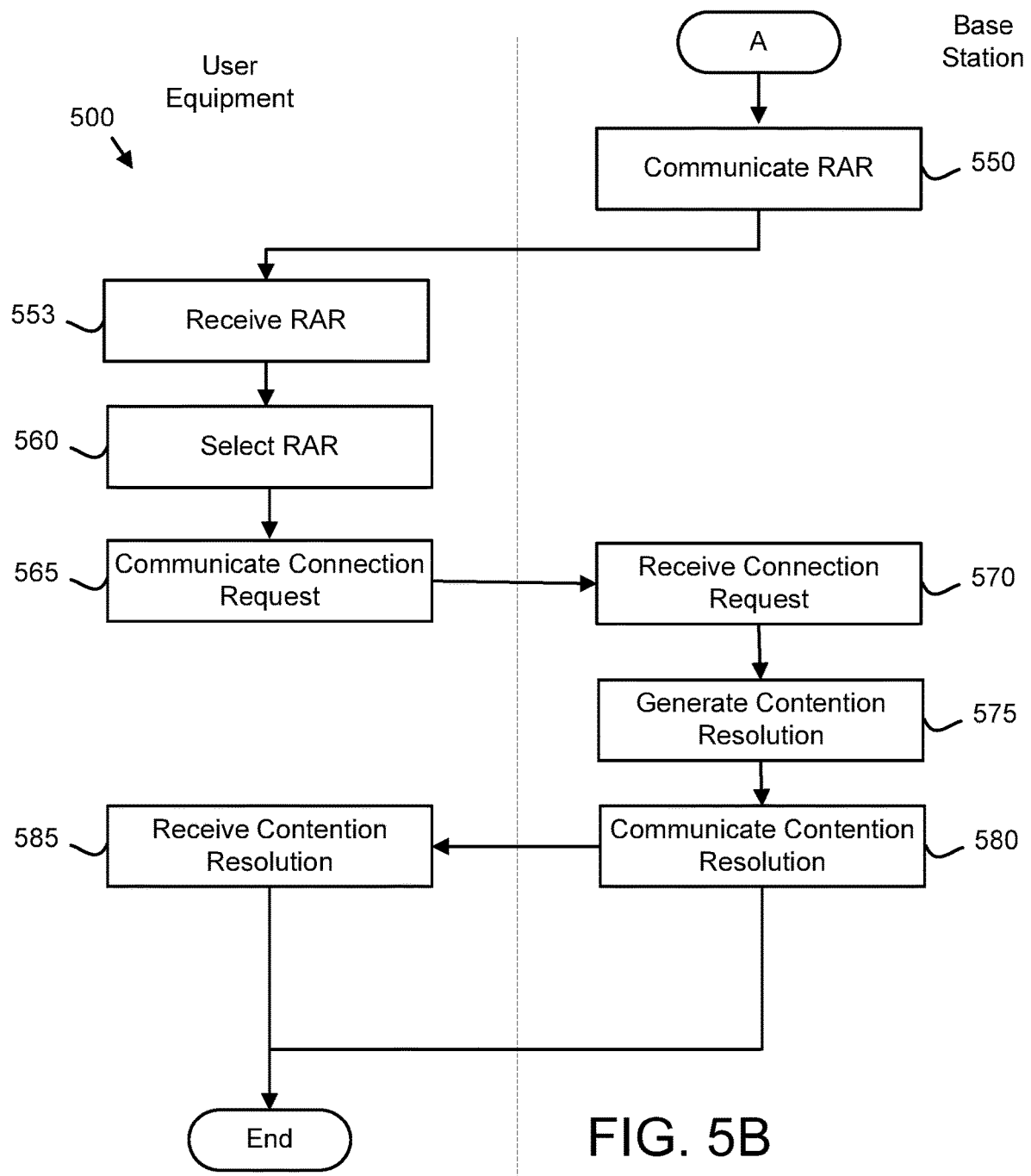

FIGS. 5A-B are schematic flow chart diagrams illustrating one embodiment of a random access method 500. The random access method 500 may establish a connection between the user equipment 110 and a network 115. In a certain embodiment, the random access method 500 establishes a connection between the user equipment 110 and the base station 105. The method 500 may be performed by the processor 405. Alternatively, the method may be performed by the memory 410 storing code that is executed by the processor 405.

The steps of the method 500 are divided by dotted lines between steps performed by the user equipment 110 and steps performed by the base station 105. The method 500 starts, and in one embodiment, the user equipment 110 communicates 505 a first random access preamble 255 to one or more base stations 105. The user equipment 110 may communicate 505 the first random access preamble 255 in order to establish a connection to the base station 105 and/or network 115.

The base station 105 receives 507 two or more first random access preamble instances 255 and determines 510 if the two or more first random access preamble instances 255 have been received. In one embodiment, each of the first random access preamble instances 255 includes an equivalent RNTI 305. As used herein, equivalent RNTI 305 are indistinguishable by the base station 105 using only the RNTI 305.

If the base station 105 determines 510 that only one first random access preamble instance 255 has been received, the base station 105 generates one unique RAR 220 and communicates 550 the one unique RAR 220 to the user equipment 110.

If the base station 105 determines 510 that two or more first random access preamble instances 255 have been received, the base station 105 determines 515 if the time advance information 310 for each first random access preamble instance 255 is different from the time advance information 310 for each other first random access preamble instance 255. In one embodiment, the time advance information instances 310 are different if the difference between the time advance information instances 310 is greater than a time advance threshold. The time advance threshold may be in the range of 2 to 7 microseconds.

If the time advance information 310 is different, the base station 105 may generate 525 one RAR 220 for each first random access preamble instance 255 and communicate 550 the RAR 220 to the user equipment 110. In one embodiment, the base station 105 generates 525 and communicates 550 only one RAR 220 for each first random access preamble instance 225.

In one embodiment, the base station 105 calculates 530 the RAR instance variable M 225 if the time advance information 310 is not different. The base station 105 may calculate 530 the RAR instance variable M 225 in response to the collision potential 235 exceeding the collision threshold 240 and/or the base station 105 detecting the two or more equivalent instances of the time advance information 310 for each first random access preamble instance 255. In one embodiment, time advance information instances 310 are equivalent if the difference between the time advance information instances 310 is less than the time advance threshold.

The base station 105 may calculate 530 the RAR instance variable M 225 using Equation 1, where k is a non-zero constant and CP is the collision potential 235.

$$M = ke^{CP} \qquad \text{Equation 1}$$

The base station 105 may generate 535 M RAR 220 for each first random access preamble instance 255 with different time advance information instances 310. For example, if the base station 105 received three first random access preamble instances 255 with different time advance information instances 310, the base station 105 would generate 535 M RAR 220 for each of the three first random access preamble instances 255. The base station 105 further communicates 550 the generated RAR 220 to the user equipment 110.

The user equipment 110 receives 555 at least one unique RAR 220. RAR 220 may be unique if distinguished from other RAR 220 by the RNTI 355. In addition, the user equipment 110 may select 560 an RAR 220. In a certain embodiment, the user equipment 110 selects 560 one unique RAR 220 in response to receiving only the one unique RAR 220. For example, if only a first RAR 220 is received, the user equipment 110 may select 560 the first RAR 220.

In one embodiment, the user equipment 110 randomly selects one unique RAR 220 from two or more unique RAR 220 in response to the two or more unique RAR 220 having equivalent time advance information 310. For example, if two unique RAR 220 with equivalent time advance information 310 are received, the user equipment 110 may randomly select one of the two unique RAR 220.

In one embodiment, the user equipment 110 selects 560 one nearest unique RAR 220 from two or more unique RAR 220 in response to the two or more unique RAR 220 having different time advance information 310 and different distances 223 from user equipment 110. For example, if the user equipment 110 receives two unique RAR 220 with different time advance information 310 and different distances 223 from the user equipment 110, the user equipment 110 may select the RAR 220 with the smallest distance 223. Alternatively, a nearest unique RAR 220 may have a shortest time delay.

The user equipment may communicate 565 a connection request 227 based on the selected first RAR 202. The base station 105 may receive 570 the connection request 227 and generate 575 the contention resolution 230 for the selected first RAR 220. The base station 105 may further communicate 580 the contention resolution 230. The user equipment 110 may receive 585 the contention resolution 230 and establish a connection with the base station 105 and the method 500 ends.

Figure 6A:
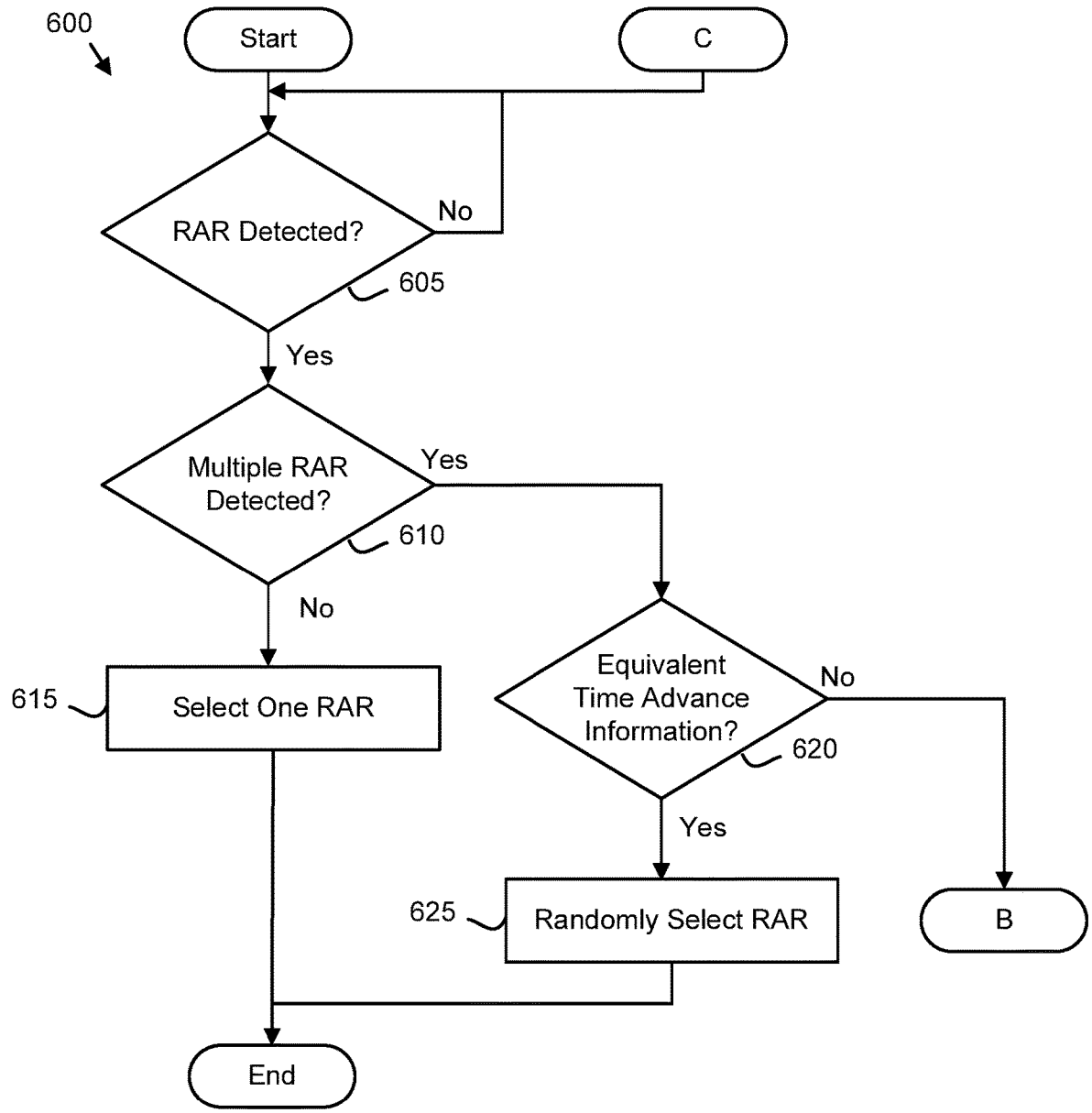
FIGS. 6A-B are schematic flow chart diagrams illustrating one embodiment of a random access response selection method.
Figure 6B:
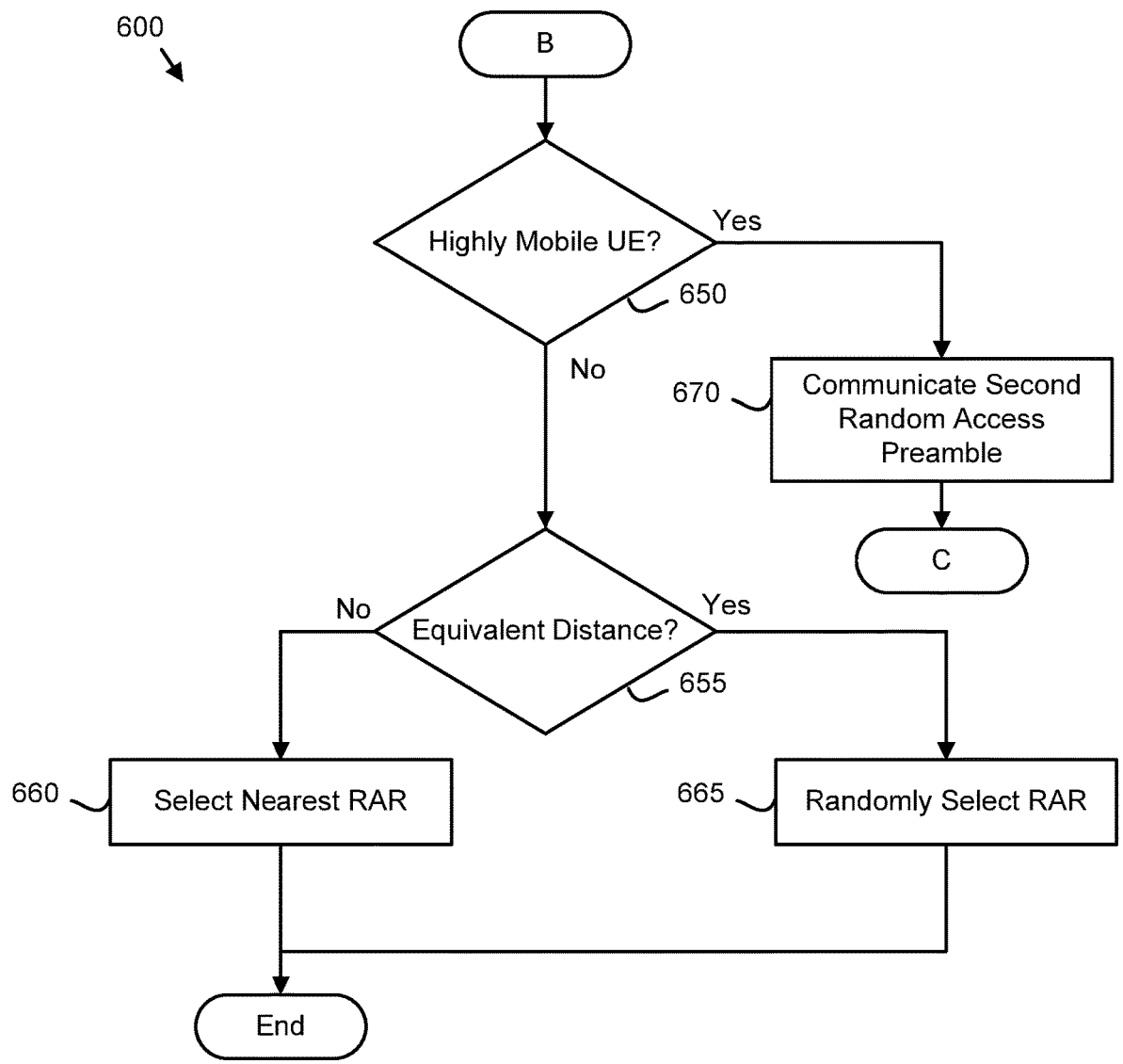

FIGS. 6A-B are schematic flow chart diagrams illustrating one embodiment of an RAR selection method 600. The method 600 may select an RAR 220 and may perform the functions of step 560 of FIG. 5B. The method 600 may be performed by a processor 405. Alternatively, the method 600 may be performed by the memory 410 storing code that is executed by the processor 405.

The method 600 starts, and in one embodiment, the user equipment 110 determines 605 if an RAR 220 is detected. If the RAR 220 is not detected, the user equipment 110 continues to determine 605 if the RAR 220 is detected.

If the RAR 220 is detected, the user equipment 110 determines 610 if two or more RAR 220 are detected. If only one RAR 220 is detected, the user equipment 110 selects the one RAR 220 and the method 600 ends.

If two or more RAR 220 are detected, the user equipment 110 determines 620 if the time advance information 310 for the two or more RAR 220 are equivalent. If the time advance information 310 for the two or more RAR 220 are equivalent, the user equipment 110 randomly selects 625 one of the two or more RAR 220 and the method 600 ends.

If the time advance information 310 for the two or more RAR 220 are not equivalent, the user equipment 110 determines 650 if the user equipment 110 is highly mobile. In one embodiment, the user equipment 110 is highly mobile if a distance 223 between the user equipment 110 and the base station 105 is greater than a separation threshold in the range of 1000 to 2000 meters. In one embodiment, the separation threshold is 1500 meters.

Alternatively, the user equipment 110 may be highly mobile if the user equipment has a displacement of greater than displacement threshold during a displacement interval. The displacement threshold may be in the range of 50 to 100 meters. In one embodiment, the displacement threshold is 100 meters.

In one embodiment, the user equipment 110 is not highly mobile if the user equipment 110 connects to only one base station 105 and a signal quality remains within a signal quality band. In a certain embodiment, the user equipment 110 may determine that the user equipment 110 is highly mobile from a smart meter feature.

If the user equipment 110 is highly mobile, the user equipment 110 may communicate 670 a second random access preamble 255 and continue to determine 605 if the RAR 220 is detected. If the user equipment 110 is not highly mobile, the user equipment 110 determines 655 if the two or more RAR 220 are from base stations 105 at equivalent distances 223 from the user equipment 110. Equivalent distance 223 may have a distance of less than a distance threshold. The distance threshold may be less than 2.7 to 3.3 microseconds, 80 to 100 kilometers, or combinations thereof.

If the RAR 220 are not from base stations with equivalent distances 223, the user equipment 110 selects 660 an RAR 220 with the nearest distance 223 and the method 600 ends. A nearest distance 223 may be a shortest physical distance and/or a shortest time delay to the base station 105. If the RAR 220 have equivalent distances 223, the user equipment 110 randomly selects 665 one of the two or more RAR 220 and the method 600 ends.

Figure 7:
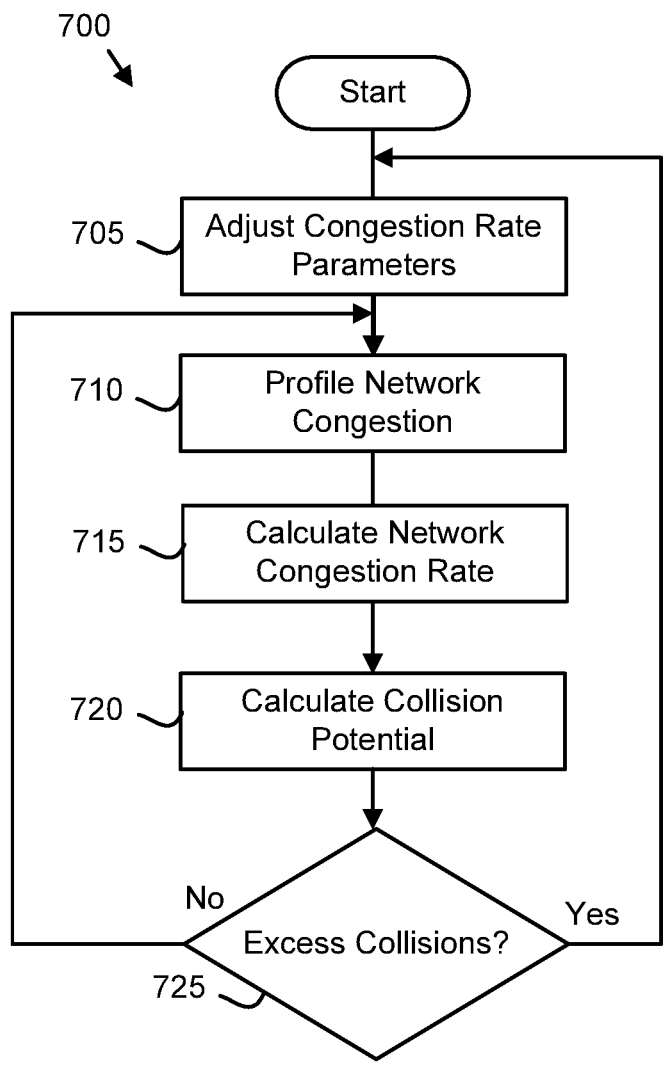
FIG. 7 is a schematic flow chart diagram illustrating one embodiment of a congestion mitigation method.

FIG. 7 is a schematic flow chart diagram illustrating one embodiment of a congestion mitigation method 700. The method 700 may mitigate congestion for the communication system 100. The method 700 may be performed by the processor 405. Alternatively, the method 700 may be performed by the memory 410 storing code that is executed by the processor 405.

The method 700 starts, and in one embodiment, the base station 105 adjusts 705 the congestion rate parameters 243. The congestion rate parameters 243 may be adjusted 705 to conform to current operating conditions.

The base station 105 may further profile 710 network congestion of the system 100. In one embodiment, the base station 105 profiles 710 one or more of a number of user equipment 110 in communication with the base station 105 per network time interval, a number of random access preambles 255 that are received per network time interval, a number of RAR 220 that are communicated per network time interval, a number of random access preamble collisions per network time interval, and the like.

The base station 105 further calculates 715 the network congestion rate 205. The network congestion rate 205 may be calculated 715 as a function of the number of user equipment 110 in communication with the base station 105 per network time interval, the number of random access preambles 255 that are received per network time interval, the number of RAR 220 that are communicated per network time interval, and the number of random access preamble collisions per network time interval.

The base station 105 may calculate 720 the collision potential 235 as a function of the network congestion rate 205. In one embodiment, the collision potential CP 235 is calculated using Equation 2, where 1 is a nonzero constant and NCR is the network congestion rate 205.

$$CP = 1\sqrt{NCR} \quad \text{Equation 2}$$

In one embodiment, the base station 105 determines 725 if there are excess collisions of random access preambles 255 and/or RAR 220. The base station 105 may determine 725 there are excess collisions if a number of collisions of random access preambles 255 and/or RAR 220 exceeds a collision threshold. If there are excess collisions, the base station 105 may adjust 705 the congestion rate parameters 243. If there are not excess collisions, the base station 105 may continue to profile 710 the network congestion.

INDUSTRIAL APPLICABILITY

The embodiments resolve access contention between user equipment 110 attempting to connect to a base station 105 and/or network 115. The access contention is resolved by generating at least one unique RAR 220 for each first random access preamble instance 255 in response to receiving two or more first random access preamble instances 255. As a result of the multiple RAR 220, contention between the first random access preamble instances 255 are resolved more rapidly.

In addition, the embodiments select one unique RAR 220 from two or more unique RAR 220 received by the user equipment 110 in response to the two or more unique RAR 210 having equivalent time advance information 310. The embodiments further select one unique RAR 220 in response to the user equipment 110 receiving only the one unique RAR 220. As a result, RAR contention is also resolved more rapidly.

The embodiments allow the user equipment 110 to quickly access the base station 105 more rapidly in environments where large numbers of user equipment 110 are accessing and/or in communication with the base station 105. As a result, wireless communications between the user equipment 110 and the base station 105 are enhanced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. A method comprising:
receiving, by use of processor, two or more first random access preamble instances with different time information;
in response to receiving the two or more first random access preamble instances with the different time information, calculating a random access response (RAR) variable M, wherein M is determined by $ke^{CP}$ where k is a non-zero constant and CP is a collision potential and the collision potential is calculated as a function of a network congestion rate; and
generating M unique RAR for each first random access preamble instance in response to one of the collision potential exceeding a collision threshold and detecting two or more equivalent instances of the time advance information for each first random access preamble instance.

2. The method of claim 1, the method further comprising calculating M by:
profiling network congestion; and
calculating the collision potential based on congestion rate parameters.

3. The method of claim 2, the method further comprising adjusting the congestion rate parameters in response to excess collisions.

4. The method of claim 1, the method further comprising:
receiving a connection request;
generating a contention resolution; and
communicating the contention resolution.

5. A method comprising:
receiving, by use of a processor, at least one unique random access response (RAR) of M RAR, wherein M is determined by $ke^{CP}$ where k is a non-zero constant and CP is a collision potential and the collision potential is calculated as a function of a network congestion rate;
selecting one unique RAR in response to receiving only the one unique RAR;
randomly selecting one unique RAR from two or more unique RAR in response to the two or more unique RAR having equivalent time advance information; and
selecting one nearest unique RAR from the two or more unique RAR in response to the two or more unique RAR having different time advance information and different distances from user equipment.

6. The method of claim 5, the method further comprising randomly selecting one nearest unique RAR from the two or more unique RAR in response the two or more unique RAR having different time advance information and equivalent distances from user equipment.

7. The method of claim 5, the method further comprising communicating a second random access preamble in response to user equipment being highly mobile.

8. The method of claim 4, the method further comprising:
communicating a random access preamble;
communicating a connection request based on the selected first RAR; and
receiving a contention resolution.

9. An apparatus comprising:
a processor performing:
in response to receiving two or more first random access preamble instances, calculating a random access response (RAR) variable M, wherein M is determined by $ke^{CP}$ where k is a non-zero constant and CP is a collision potential and the collision potential is calculated as a function of a network congestion rate; and
generating M unique RAR for each first random access preamble instance in response to one of the collision potential exceeding a collision threshold and detecting two or more equivalent instances of the time advance information for each first random access preamble instance.

10. The apparatus of claim 9, the processor further calculating M by:
profiling network congestion;
calculating the collision potential based on congestion rate parameters.

11. The apparatus of claim 10, the processor further adjusting the congestion rate parameters in response to excess collisions.

12. The apparatus of claim 9, the processor further performing:
receiving a connection request;
generating a contention resolution; and
communicating the contention resolution.

13. An apparatus comprising:
a processor performing:
receiving at least one unique random access response (RAR) of M RAR, wherein M is determined by $ke^{CP}$ where k is a non-zero constant and CP is a collision potential and the collision potential is calculated as a function of a network congestion rate;
selecting one unique RAR in response to receiving only the one unique RAR;
randomly selecting one unique RAR from two or more unique RAR in response to the two or more unique RAR having equivalent time advance information; and
selecting one nearest unique RAR from the two or more unique RAR in response to the two or more unique RAR having different time advance information and different distances from user equipment.

14. The apparatus of claim 13, the processor further randomly selecting one nearest unique RAR from the two or more unique RAR in response the two or more unique RAR having different time advance information and equivalent distances from user equipment.

15. The apparatus of claim 13, the processor further communicating a second random access preamble in response to user equipment being highly mobile.

16. The apparatus of claim 13, the processor further performing:
communicating a random access preamble;
communicating a connection request based on the selected first RAR; and
receiving a contention resolution.

* * * * *